C. A. PARSONS, S. S. COOK & L. M. DOUGLAS.
LUBRICATION OF THRUST BEARINGS.
APPLICATION FILED JAN. 15, 1917.

1,296,211.

Patented Mar. 4, 1919.
2 SHEETS—SHEET 1.

Inventors:
Charles A Parsons,
Stanley S. Cook,
Louis M. Douglas,
Middleton Donaldson Speer
Attorneys C. A. PARSONS, S. S. COOK & L. M. DOUGLAS.
LUBRICATION OF THRUST BEARINGS.
APPLICATION FILED JAN. 15, 1917.

1,296,211.

Patented Mar. 4, 1919.
2 SHEETS—SHEET 2.

Inventors:
Charles A. Parsons,
Stanley S. Cook,
Louis M. Douglas,
Att'ys.

UNITED STATES PATENT OFFICE.

CHARLES ALGERNON PARSONS, STANLEY SMITH COOK, AND LOUIS MORTIMER DOUGLAS, OF WALLSEND, ENGLAND; SAID COOK AND SAID DOUGLAS ASSIGNORS TO SAID PARSONS.

LUBRICATION OF THRUST-BEARINGS.

1,296,211.      Specification of Letters Patent.      Patented Mar. 4, 1919.

Application filed January 15, 1917. Serial No. 142,544.

*To all whom it may concern:*

Be it known that we, the Hon. Sir CHARLES ALGERNON PARSONS, K. C. B., STANLEY SMITH COOK, and LOUIS MORTIMER DOUGLAS, all subjects of the King of Great Britain and Ireland, and all of Turbinia Works, Wallsend-on-Tyne, in the county of Northumberland, England, have invented certain new and useful Improvements in and Relating to the Lubrication of Thrust-Bearings, of which the following is a specification.

The present invention relates to the lubrication of thrust bearings of the type in which a plurality of collars are provided on the rotating member, these collars bearing against stationary collars, and this invention relates more particularly to thrust bearings of this type in which fresh lubricant is fed through radial ducts in the stationary collars to the annular spaces between the roots of adjacent revolving collars, and the inner surfaces of the stationary collars.

The object of the present invention is to make use of the pumping action due to the rotation of the collars and the viscosity of the lubricant, to insure that fresh lubricant is circulated across the entire working face of each collar.

The invention consists in providing two sets of gutters in the working faces of the stationary collars, the two sets being oppositely inclined and extending completely across the working face, so as to provide clear passages through which when rotation takes place in either direction, lubricant admitted to the roots of the revolving collars can flow outward to outlets at the roots of the stationary collars.

The invention further consists in providing at the inner surface of each stationary collar, recesses with each of which the inner ends of a radial inlet duct and a pair of oppositely inclined gutters communicate, the outer ends of the inclined gutters being arranged to freely discharge lubricant received from the inlet duct beyond the periphery of the adjacent revolving collar.

The invention further consists in the improved thrust bearings and details thereof hereinafter described.

Referring to the accompanying drawings:—

Fig. 5 is a section on the line V—V, Fig. 3, while

In carrying the invention into effect according to the form illustrated as applied to a thrust bearing of the kind in which the stationary collars $a$, $a$ are divided into two parts, one adapted to receive forward thrust and the other rearward thrust, there are provided a plurality of collars $b$ upon the rotating member $c$.

The stationary members are secured in a suitable housing, preferably in the form of castings $d$, and having suitable passages $e$ provided for the inlet and passages $f$ for the outlet of lubricant. Each half of a stationary collar is provided with at least two radial ducts which are carried completely through the collar to the inner surface of the same. At the inner ends of the inlet ducts, recesses $g$ are provided which are carried through to the working face of the collar. Upon the working face of the collar gutters or grooves $h$ are provided sloping in opposite directions and extending from the recesses above mentioned outwardly to the periphery of the stationary collar.

Two such grooves or gutters extending in opposite directions preferably communicate with the inner end of each inlet duct $e$.

The outer ends of the inclined gutters are carried sufficiently past the working surface of the collar to permit the free escape of lubricant when the co-acting face of a revolving collar is in lubricated contact with the stationary collar face.

In some cases it is desirable to provide a recess $k$ in the form of a circumferential groove or gutter into which the inclined gutters can discharge. The provision of such a circumferential gutter also prevents the formation of ridges in the face of the stationary collar due to wear; such a ridge formed by wear would impede the free escape of the lubricant.

Figure 1:
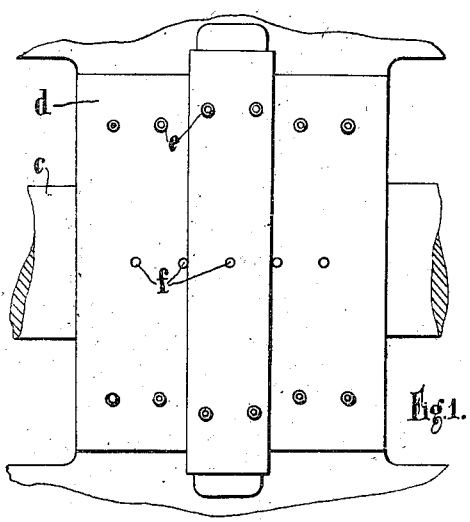
Figure 1 is a plan of the housing carrying the stationary collars, the outer casting being partially removed.
Figure 2:
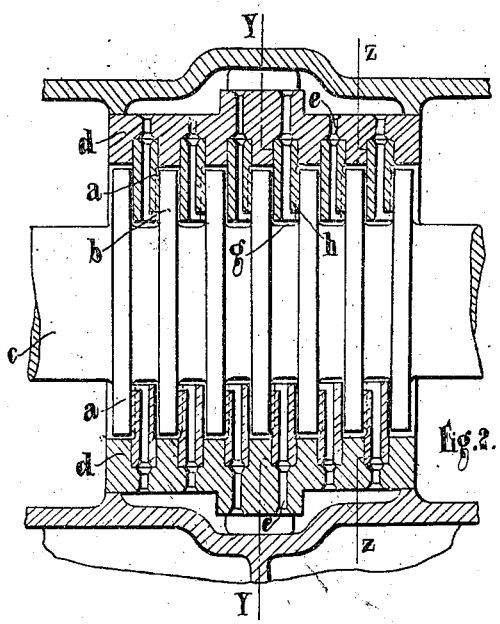
Fig. 2 is an axial section on the line X—X, Fig. 3.
Figure 4:
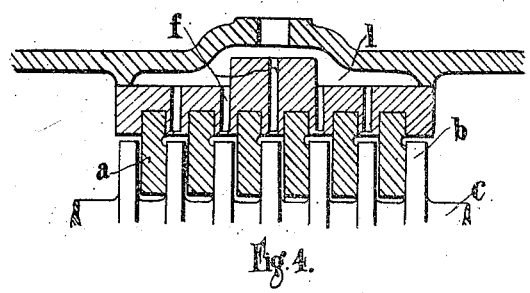
Fig. 4 is a section on the line T—T, Fig. 3.
Figure 5:
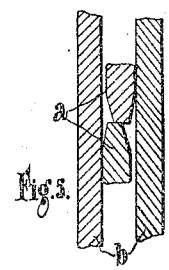
Figure 3:
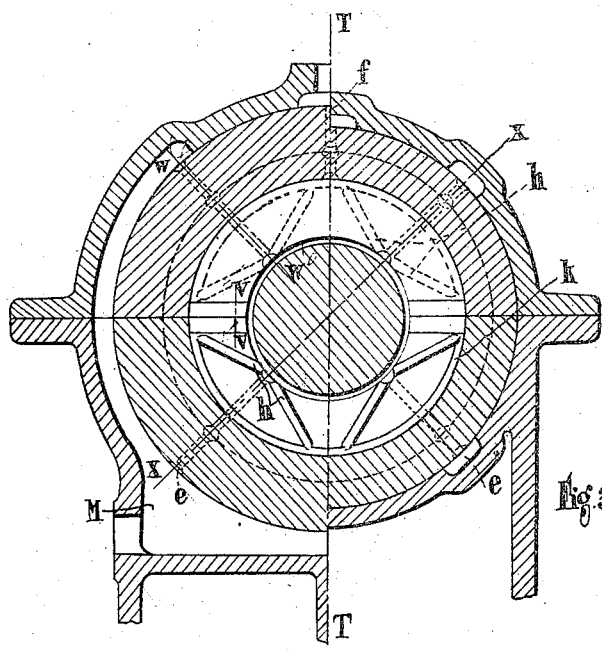
Fig. 3 is a transverse section, the left-hand side on the line Y—Y and the right-hand side on the line Z—Z, Fig. 2.
Figure 6:
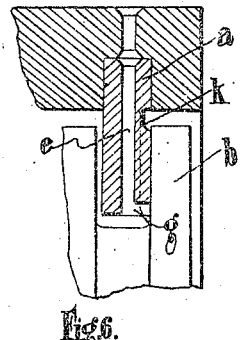
Fig. 6 is a section on the line W—W, Fig. 3.

The ends of the stationary collars a or horseshoes, are preferably chamfered, as shown in Fig. 5, to prevent lubricant being swept off the face of the rotating collar.

It will be seen that the construction described provides gutters having an unrestricted passage for lubricant across the entire working face of the stationary collars; the gutters thus do not act merely as reservoirs for oil but in conjunction with the rotating collars and the viscosity of the oil, they provide a viscous pump to accelerate the outward flow of lubricant, thus insuring that fresh oil is being circulated continuously across the working faces of the collars.

By providing two sets of inclined gutters h, h, inclined in opposite directions, the action described can take place in either direction of rotation of the member whose thrust is to be supported.

It is preferred to provide the outlet passage l from the housing at the upper side of the housing, this passage communicating by suitable radial ducts j, with the spaces between the roots of adjacent stationary collars and the peripheries of the rotating collars. By arranging that the total area for flow through the inlet ducts is larger than that of the outlet ducts, the bearing is completely flooded with oil under a slight pressure.

It will be understood that although described with reference to a thrust bearing having divided stationary collars, the present invention is equally applicable to a thrust bearing having undivided disk-like stationary collars or to thrust bearings of the kind in which although divided collars are employed, no adjustment is provided for, and only lubricant clearance is provided between adjacent revolving collars and the interposed stationary collars.

It is also applicable to cases in which the thrust is in one direction only, in which case the gutters are cut on one side only of the stationary collars.

It is obvious that many modifications may be made in carrying the present invention into effect without departing from the spirit of the same.

Having now described our invention, what we claim as new and desire to secure by Letters Patent is:—

1. A thrust bearing comprising a rotating member, a plurality of collars on said member, a fixed member, stationary collars on said fixed member, said rotating collars interengaging with said stationary collars, two sets of gutters on the working faces of said stationary collars, said sets being oppositely inclined and extending completely across the working face, means for admitting lubricant to the roots of said revolving collars through passages extending centrally between the stationary collars, and outlets for lubricant at the roots of said stationary collars, as and for the purpose set forth.

2. A thrust bearing comprising a rotating member, a plurality of collars on said member, a fixed member, stationary collars on said fixed member, said rotating collars interengaging with said stationary collars, two sets of gutters on the working faces of said stationary collars, said sets being oppositely inclined and extending completely across the working face, means for admitting lubricant to the roots of said revolving collars, radial inlet ducts leading to the roots of said rotating collars, recesses in said stationary collars in communication with the inner ends of said radial ducts and a pair of oppositely inclined gutters, and discharge passages for lubricant beyond the periphery of said revolving collars, as set forth.

In testimony whereof we have signed our names to this specification.

CHARLES ALGERNON PARSONS.
STANLEY SMITH COOK.
LOUIS MORTIMER DOUGLAS.